US012627946B2

(12) United States Patent
Divvi et al.

(10) Patent No.: US 12,627,946 B2
(45) Date of Patent: May 12, 2026

(54) METHOD AND SYSTEM FOR SUPPORTING NON-EMERGENCY COMMUNITY SERVICES OVER WIRELESS LOCAL AREA NETWORK (WLAN)

(71) Applicant: Charter Communications Operating, LLC, St. Louis, MO (US)

(72) Inventors: Venkata Ramana Divvi, Centennial, CO (US); Christopher J. Teague, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 613 days.

(21) Appl. No.: 18/115,717

(22) Filed: Feb. 28, 2023

(65) Prior Publication Data
US 2024/0292184 A1     Aug. 29, 2024

(51) Int. Cl.
　*H04W 4/029*　　(2018.01)
　*H04W 4/06*　　(2009.01)
　*H04W 48/10*　　(2009.01)
　*H04W 84/12*　　(2009.01)

(52) U.S. Cl.
　CPC ............. *H04W 4/029* (2018.02); *H04W 4/06* (2013.01); *H04W 48/10* (2013.01); *H04W 84/12* (2013.01)

(58) Field of Classification Search
　CPC ........ H04W 4/029; H04W 4/06; H04W 48/10
　USPC ....................................................... 370/259
　See application file for complete search history.

(56) References Cited

U.S. PATENT DOCUMENTS

| | | | |
|---|---|---|---|
| 7,853,003 B2 | 12/2010 | Sabinson et al. | |
| 8,705,703 B2 | 4/2014 | Orwick et al. | |
| 9,230,292 B2 * | 1/2016 | Amin ................. | G06Q 30/0284 |
| 9,635,174 B1 * | 4/2017 | Montero ............... | H04N 7/147 |
| 2017/0289783 A1 * | 10/2017 | Bergius ................ | H04W 76/50 |

FOREIGN PATENT DOCUMENTS

WO　　　2007/078985 A1　　7/2007

* cited by examiner

*Primary Examiner* — Jirapon Tulop
(74) *Attorney, Agent, or Firm* — The Marbury Law Group, PLLC

(57) ABSTRACT

Methods and devices are disclosed for supporting non-emergency community services in a wireless communication network. An end user device may detect activation of an over-the-top (OTT) application, which may be configured to monitor surrounding wireless networks. The end user device may also receive broadcasts identifying a wireless network from an access point that is located nearby, and determine whether the wireless network supports non-emergency community services based on the received broadcasts. In response to determining that the wireless network supports non-emergency community services, the end user device may send a request for details about supported non-emergency community services to the access point, receive a response message from the access point identifying location-specific non-emergency community services offered by the wireless network, and display the offered location-based non-emergency community services.

24 Claims, 8 Drawing Sheets

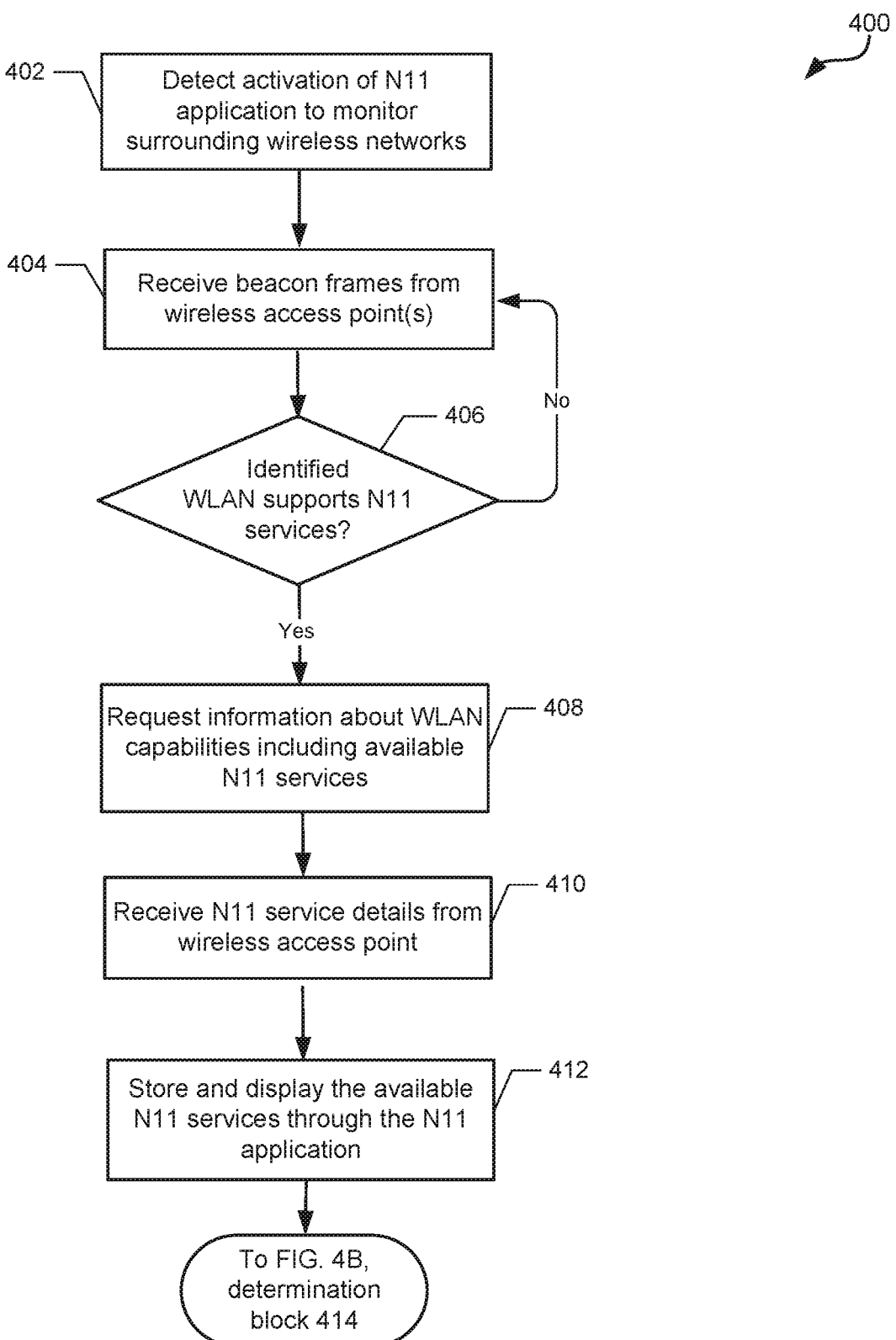

400

402 — Detect activation of N11 application to monitor surrounding wireless networks 404 — Receive beacon frames from wireless access point(s)

406 — Identified WLAN supports N11 services?

No

Yes

408 — Request information about WLAN capabilities including available N11 services 410 — Receive N11 service details from wireless access point 412 — Store and display the available N11 services through the N11 application To FIG. 4B, determination block 414

Broadcast beacon frames with indication that N11 services are supported

504

Receive request for N11 service details from user device?

No

Yes

Send request for N11 service details with location and device information to provisioning server 506

Receive N11 services profile from the provisioning server 508

Send location based N11 service details to the user device 510

METHOD AND SYSTEM FOR SUPPORTING NON-EMERGENCY COMMUNITY SERVICES OVER WIRELESS LOCAL AREA NETWORK (WLAN)

BACKGROUND

Wireless local area networks (WLANs) are becoming increasingly popular access networks, both in public and private areas. Another development of the past years has been the growing use of Internet Protocol (IP)-based data networks for the transmission of real-time data such as voice and video. Several standards dealing with voice-over-IP (VOIP) applications have been introduced, such as the codec standards G.711 and G.729, and the real-time transport protocol (RTP).

Therefore, updates to current WLAN technology are typically desired in order to handle real-time applications, such as voice over WLAN, as subscribers require the same voice quality, reliability and functionality as exists using a legacy Public Switched Telephone Network (PSTN) telephone or through a mobile network (e.g., third generation partnership project (3GPP) access network, such as a Global System For Mobile Communications (GSM) EDGE Radio Access Network (GERAN), Universal Terrestrial Radio Access Network (UTRAN) or Evolved Universal Mobile Telecommunications Service (UMTS) Terrestrial Radio Access Network (E-UTRAN)).

Legacy landline (Public Switched Telephone Network, PSTN) integrated with intelligent networks and existing wide area cellular wireless networks supports the short code dialing for various emergency and non-emergency services. However, the existing standards lacking the support Wi-Fi calling using short codes for non-emergency community services.

In recent years, WLAN has been adopted as access technology for both broadband internet and voice services (over the top VoIP applications & Wi-Fi calling) inside and outside of the cellular coverage areas. While voice over WLAN technology is deployed by many wireless service providers, there have been limitations in supporting voice calls over WLAN for non-emergency community services that are typically accessible by abbreviated three-digit phone number (i.e., "N-1-1"). In the absence of regular cellular coverage, existing standards do not enable the use of N11 short codes to access non-emergency community services over WLAN voice calls.

SUMMARY

Various disclosed aspects may include apparatuses and methods for supporting non-emergency community services in a wireless communication network. Embodiments include detecting activation of an over-the-top (OTT) application, receiving broadcasts from an access point that is located nearby which identify a wireless network, and determining whether the wireless network identified by the broadcasts supports non-emergency community services based on the received broadcasts. In some embodiments, the OTT application may be configured to monitor surrounding wireless networks.

Some embodiments may further include, in response to determining that the wireless network identified by the broadcasts supports non-emergency community services, sending a request for details about supported non-emergency community services to the access point, receiving a response message from the access point identifying location-specific non-emergency community services offered by the wireless network, and displaying the offered location-based non-emergency community services.

In some embodiments, displaying the offered non-emergency community services may be done at least in part through the OTT application. In some embodiments, the broadcasts from the nearby access point may be beacon frames that include at least a service set identifier (SSID) for the wireless network.

Some embodiments may further include, in response to determining that the identified wireless network supports non-emergency community services, determining whether user input requesting one of the offered location-based non-emergency services is detected.

In some embodiments, the user input requesting one of the offered location-based non-emergency services may be a numeric short code. Some embodiments may further include, in response to determining that user input requesting one of the offered location-based non-emergency services is detected, linking the detected service request with contact information for a target location-based call center, and establishing a voice call with the target location-based call center.

In some embodiments, linking the detected service request with contact information for the target location-based call center may be performed at least in part by the OTT application.

In some embodiments, the voice call with the target location-based call center may be a communication using voice-over-IP (VOIP) or voice-over-wireless local area network (WLAN). In some embodiment, the non-emergency services may be selected from one or more of community information/referral services, non-emergency police services, directory assistance services, transportation information services, telecommunications relay services, and underground public utility location services.

In some embodiments, the request for details about supported non-emergency community services sent to the access point may be a probe request frame. In some embodiments, the location-specific community non-emergency community services offered by the wireless network may be set by a network operator and stored on a provisioning server in communication with the access point.

Embodiments further include broadcasting information identifying a wireless network associated with the access point and an indication that non-emergency community services are supported, receiving a request from a user device for details about the supported non-emergency community services, sending a message with location and capabilities of the user device to a provisioning server, receiving a non-emergency community services profile from the provisioning server, and sending a message to the user device identifying the available location-based non-emergency community services. In some embodiments, the non-emergency community services profile may identify location-based non-emergency community services available through the wireless network to the user device.

In some embodiments, the non-emergency community services profile may be provisioned by a network operator through an interface on the provisioning server.

Further aspects include a computing device having a processor configured with executable instructions to perform operations of any of the methods summarized above. Further aspects include a computing device having means for performing functions of any of the methods summarized above. Further aspects include a non-transitory processor-readable medium having stored thereon processor-executable instructions configured to cause a processor and other components of a computing device to perform operations of any of the methods summarized above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 4A and 4B are process flow diagrams illustrating an example method for accessing non-emergency community services through voice-over-WLAN calls according to various embodiments.

DETAILED DESCRIPTION

Figure 1:
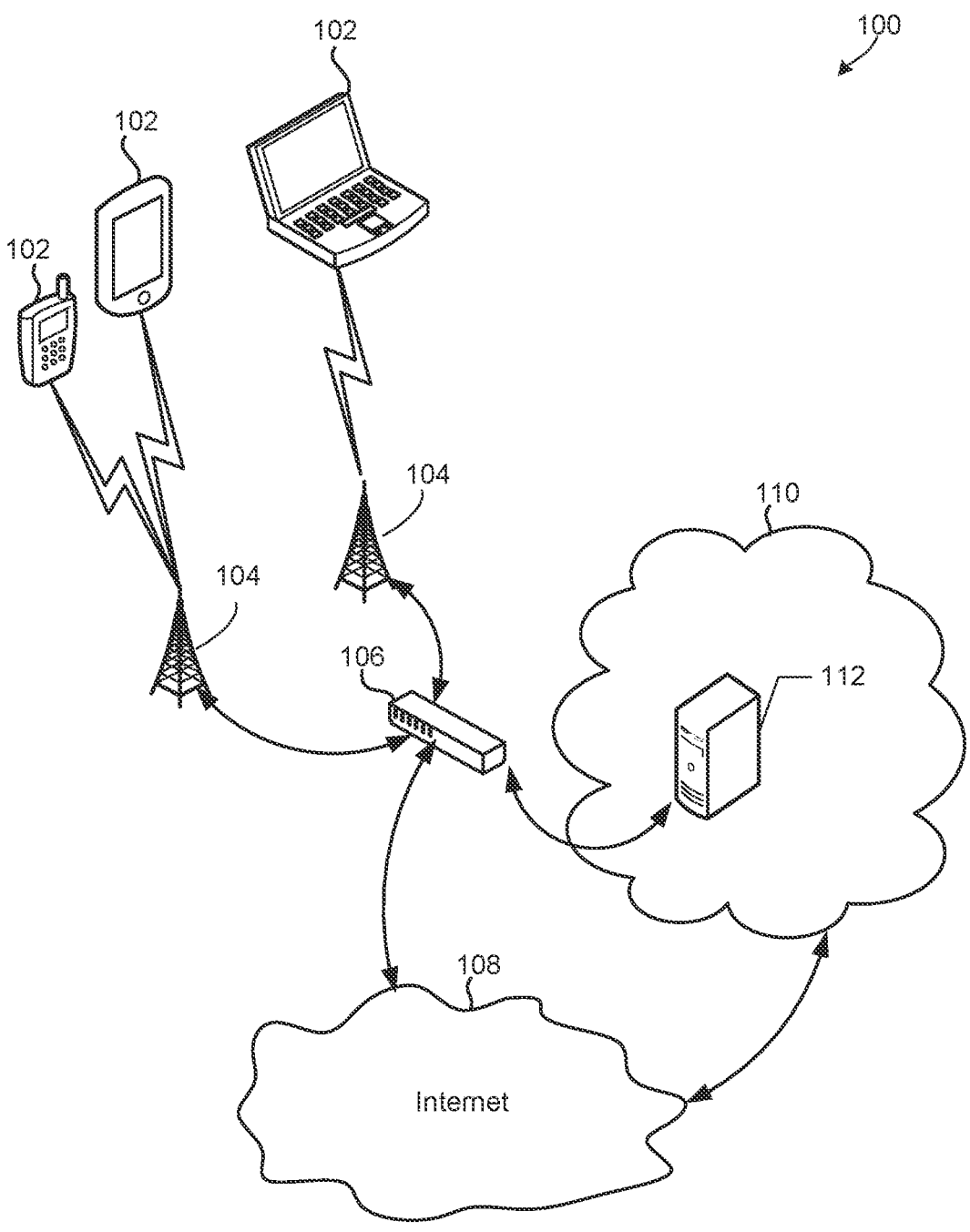
FIG. 1 is a communication system block diagram of a communication network suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "user device," "end user device," "computing device," and "wireless device" are used interchangeably herein to refer to any one or all of laptop computers, rack mounted computers, cellular telephones, smart phones, personal or mobile multi-media players, convertible laptops/tablets (2-in-1 computers), personal data assistants (PDAs), personal computers, tablet computers, smart books, ultrabooks, notebooks, palm-top computers, desk-top computers, mobile gaming consoles, wireless electronic mail receivers, multimedia Internet enabled cellular telephones, wireless gaming controllers, streaming media players (such as, ROKU™), smart televisions, digital video recorders (DVRs), modems, and similar electronic devices which include a programmable processor and memory and circuitry for establishing wired or wireless communication pathways and for transmitting/receiving data via a telecommunications network as well as providing the functionality described herein. The term "computing device" may further refer to stationary computing devices including personal computers, desktop computers, all-in-one computers, workstations, super computers, mainframe computers, embedded computers, servers, home theater computers, and game consoles.

The terms "telecommunications network," "telecommunications system," "communications system," "service provider network," "service network," and "communication network," "home network" are used interchangeably herein to describe a transmission system that enables user data and control information to be exchanged between various sites, using wired and/or wireless infrastructure. Examples of telecommunication networks that may be used herein include cable television, internet, mobile networks, and combinations thereof.

The terms "Wi-Fi," "wireless local area network," "WLAN," and "access network" may be used interchangeably to refer to a group of devices that form a network based on radio transmissions. The terms "wireless access point" and "access point" may be used to refer to a device that allows one or more wireless devices to connect to a wired network using, for example, Wi-Fi, Bluetooth®, or related standards. The wireless access point may connect to a router (via a wired network), and may relay data between the wireless devices (such as computers, mobile communications devices, etc.) and at least wired device on the network.

The terms "N11," "N11 code" or "short code" are used herein to refer to an abbreviated dialing phone number that allows access to specified non-emergency services. While such codes set aside by the North American Numbering Plan (NANP) are three-digit numbers in the format of "N-1-1" (e.g., 211, 311, etc.), other localities' equivalent numbers could also be used.

The terms "non-emergency services," "community services," and "N11 services" are used interchangeably herein to refer to any of a variety of non-emergency community services made available to individuals on demand via wireless network communications. Examples include, but are not limited to, community information/referral services, non-emergency police services, directory assistance services, transportation information services, telecommunications relay services, and underground public utility location services.

The term "N11 call center" is used herein in connection with non-emergency community services, and is generic to reference one or more of the following: non-emergency police, governmental agencies, utility companies, telecommunications network operators/service providers, and/or any of a variety of other local or national entities depending on the specific service requested.

The exemplary systems and methods will also be described in relation to software (such as drivers), modules, and associated hardware. However, to avoid unnecessarily obscuring the present disclosure, the following description omits well-known structures, components and devices that may be shown in block diagram form, are well known, or are otherwise summarized.

The terms "telecommunications service provider," "communications service provider," "network service provider," "service provider,"," and "network operator" are used interchangeably herein to describe a provider of telecommunications services that controls elements to sell and deliver services to an end user, and provides necessary provisioning and credentials as policies implemented in user device subscriptions.

The terms "user data," "subscriber data," and "device data" are used interchangeably herein to refer to data traffic that is configured for transmission to or reception from one or more user device in subscriber's home network.

The term "server" is used herein to describe any computing device capable of functioning as a server, such as a master exchange server, web server, mail server, document server, or any other type of server. A server may be a dedicated computing device or a computing device including a server module (e.g., running an application which may cause the computing device to operate as a server).

The various embodiments enable user devices to access, and service providers/network operators to support, wireless local area network (WLAN) voice calling for non-emergency services using existing short codes.

An over-the-top (OTT) application installed on a user device may monitor surrounding WLAN access points according to various embodiments. In instances in which the user device is within an access point's coverage area, the OTT application can receive information about the non-emergency community services supported by the corresponding network in that location. The information regarding the non-emergency community services supported by the corresponding network in that location may be displayed to the user prior to the device associating with the access point. In order to provide information regarding the non-emergency community services supported by the network, the access point may be configured to relay location and capability data from the user device to a Community Services Provisioning Server. In various embodiments, such location and device capabilities may be provided by the OTT application running on the user device.

Based on the location and capability data provided, the provisioning server may send a service profile to the access point. Depending on the service provider/network operator's integration capabilities, the OTT application on the user device may communicate with non-emergency service delivery centers via call center gateways using WLAN voice calling.

Telecommunications networks are widely deployed to provide various services, such as connectivity to an internet service provider (ISP) or a media content provider, sending and receiving voice data, packet data, broadcast messages, etc.

Market adoption of wireless local area network (WLAN) technology has substantially increased, as users from a wide range of backgrounds and industries have brought this technology into their homes, offices, and increasingly into the public air space. Increasingly users are depending on WLANs to improve the timeliness and productivity of their communications and applications, and in doing so, require greater visibility, security, management, and performance from their networks. For cellular, support of emergency calls resulted from regulatory requirements imposed on the technology and is therefore widely implemented in most wireless cellular networks and handsets.

Legacy public switched telephone network (PSTN) and existing wide area cellular wireless networks support short code dialing for various emergency and non-emergency services. In recent years, voice-over-Internet Protocol (VOIP) and voice-over-WLAN (VoWLAN) have been adopted as access technology for both broadband internet and voice services, such as through over-the-top (OTT) VOIP applications and Wi-Fi calling. However, the existing standards lack support for voice calls over wireless broadband networks (e.g., IEEE 802.11 technology) using short codes for non-emergency community services.

Short codes are abbreviated dialing phone numbers that may be in the format of "N-1-1." Such short codes, also referred to as "N11 codes," allow access to specific services for a defined region (e.g., city, state, county, etc.), with each N11 code having a different assigned use. For example, with the code "911" reserved for emergency services, the typical N11 codes for corresponding non-emergency community services include: "211" for community information and referral services, "311" for non-emergency police services, "411" for directory assistance services, "511" for transportation information services, "711" for telecommunications relay services, and "811" for underground public utility location services.

Therefore, a user could reach a desired N11 service in their region by dialing the N11 code (e.g., "511") or by dialing the corresponding alternate number assigned to that region, location, or community directly, for example, a 10 digit number in the United States. Each N11 code may have a variety of different alternate numbers depending on the location of the user (e.g., according to city, county, and/or state), in which the location may be defined by political boundaries (e.g., city, state, county, etc.). In other words, a first user in a first location (e.g., Virginia) that initiates a call by dialing an N11 code should be connected to a different N11 service (i.e., service offered in that region) than a second user in a second location (e.g., New York) who initiates a call by dialing the same N11 code.

Current standards enable emergency service (i.e., 911) support for voice-over-WLAN through a capable (i.e., authorized) access point within the network (i.e., WLAN) configured with required access network options flags, and to advertise emergency service support through beacons and probe response frames that include an Unauthenticated Emergency Service Accessible (UESA) bit set. In this manner, all wireless devices within the vicinity of the supporting access point may receive the details of the dedicated emergency SSID during network discovery, including the UESA bit set that indicates that the network supports emergency services.

The various embodiments provide support for non-emergency service calls using voice over WLAN technology. Specifically, the various embodiments provide network elements for service providers and network operators to define the non-emergency community services offered in different geographical regions, such as through provisioning interfaces. The various embodiments also enable information about the supported community services for a network to be easily relayed to user devices, allowing users to access locally available N11 services in the absence of regular cellular coverage.

In various embodiments, a Community Services Provisioning Server may be incorporated as a network element. The provisioning server may be configured with geographic location-based N11 service profiles offered by various service providers. In various embodiments, a service provider may configure such a profile to provide information about what N11 services the service provider may offer in a particular location (e.g., per county, city, zip code, etc.) based on local service delivery points.

In accordance with the mechanisms defined in current standards (e.g., 802.11u), the access points and backend network may be configured to continuously advertise information to user devices within the network by periodically transmitting beacon frames. Such information may provide user devices with the ability to identify a nearby network (i.e., WLAN), and learn about the nearby network's capabilities prior to associating with the nearby network. For example, the beacon frames may include a network identifier, such as a Service Set Identifier (SSID), which is a unique case-sensitive string of up to 32 alphanumeric characters that identifies a radio network based on IEEE 802.11.

Each access point of a WLAN may be capable of simultaneously providing multiple SSIDs, each with the access point's own beacon frames. Therefore, wireless access points may each be configured to broadcast beacon frames associated with at least one SSID, sent at a defined interval (e.g., every 102.4 ms). In particular, a wireless access point in a WLAN that supports non-emergency community services, may have enabled an indicator for non-emergency community services availability in the wireless access point's beacon frames for at least one SSID that is associated with access point.

In various embodiments, a user's wireless device may be configured with an OTT N11 application, referred to herein as an "N11 application." Such application may be downloaded by user selection, or may be pre-installed on a wireless communication device by the manufacturer/service provider. In various embodiments, based on beacon frames, the user device may identify one or more access point serving a coverage area in which the user device is located.

The user device, such as through the N11 application, may detect whether the identified access point(s)/respective SSID(s) supports non-emergency community services. In particular, the user device (i.e., the connection manager and/or N11 application on the device) may collect from each detected access point/SSID indicating that non-emergency community services are enabled, information about the capabilities and the specific N11 services provided. For example, the wireless user device may request such information from a detected wireless access point/associated SSID by sending a probe response frame to the access point.

The receiving access point may in response to the probe response frame, request N11 service details (i.e., information about which N11 services are supported by the network) from the community services provisioning server. In particular, the wireless access point may send a request message to the provisioning server including location information (i.e., of the access point and/or of the user device), and information about the user device capabilities. The provisioning server may send one or more N11 services profile in a response message to the wireless access point. In this manner, the wireless access point is given a list of N11 services that are both supported by the service provider and are available to the user device based on the user device's location. In embodiments in which the wireless access point is configured with multiple SSIDs, each SSID may have a respective N11 services profile provided by the provisioning server.

In various embodiments, the wireless access point may send information about the accessible N11 services to the user device. In some embodiments, such information may be sent in a public action frame response message. In various embodiment, based on the information received from the access point, the N11 application on the user device may collect, store, and display information about the accessible N11 services provided by the network in the current location. Specifically, the N11 application may display on the user device the N11 services that are available for selection by a user.

In various embodiments, in response to detecting a user selection invoking an N11 service request through the application, the user device may use conventional methods to associate to the network (i.e., WLAN), such as using 802.11 open system authentication. The user selection may be, for example, dialing of a short code associated with one of the non-emergency community services displayed through the application interface. The N11 application may map the user's selection to a location-based destination call center number for the service. The N11 application may establish the call with the appropriate N11 service call center through the operator's core network. In some embodiments, establishing the call with an N11 service call center may be accomplished via a gateway using voice-over-IP or voice-over-WLAN calling.

In various embodiments, telecommunications services may be provided to user wireless devices via a connection to a network, such as a cellular telephone network, WAN, LAN, WLAN, terrestrial network, satellite network, etc., and/or other well-known technologies. Such networks may be accessed via any of a number of wireless and/or wired connections, including through a radio frequency (RF) resource, wireless adapter, coaxial cable, fiber optic cables, DSL interface, Worldwide Interoperability for Microwave Access (WiMAX), or an Integrated Service Digital Network (ISDN) interface.

The various embodiments may be implemented within a variety of communications systems, an example of which is illustrated in FIG. 1. The communications system 100 may be used by a multiple system operator (MSO), internet service provider (ISP), cellular service provider, or other type of service provider that facilitates messaging and/or other network-based messaging/signaling between one or more server connected to the Internet or other external network.

The communications system 100 may include a plurality of end user devices 102, which may be configured to communicate via a Wi-Fi network, an Ethernet network, a cellular telephone network, a radio access network, a WiMAX network, and/or other well-known technologies. The end user devices 102 may each be configured to receive and transmit data and control signals to and from an access point 104 (e.g., a wireless access point, router, hub, broadband gateway, base station, etc.), which may be coupled to a controller operable to transmit the data and control signals between to other network destinations. The controller may be, for example, a service gateway, wireless LAN controller (WLC), cellular base station, radio network controller, etc. For each end user device 102, signaling with the access point 104 may be performed via a wireless and/or a wired connection.

The access point 104 may communicate with an access gateway 106 of a communications service provider (e.g., a packet data network gateway (PGW), a cable modem termination system (CMTS), a wireless access gateway (WAG), broadband network gateway, etc.) that serves as the primary point of entry and exit for end user device traffic. The access gateway 106 may be implemented in a single computing device or in many computing devices.

Functions of the access gateway 106 may include, but are not limited to, forwarding data and control signals to network components as user data packets, providing connectivity to external data sources/networks, managing and storing network/internal routing information, and/or acting as an anchor between different technologies (e.g., Wi-Fi, broadband, 3G/4G/5G systems, etc.). The access gateway 106 may also coordinate the transmission and reception of data to and from the Internet 108, and the transmission and reception of voice, data and control information to and from an external service network connected to the Internet 108, as well as other access points 104.

Through the access gateway 106, the end user devices 102 may be connected to a service network 110 either directly or via the Internet 108. The service network 110 may control a number of services for individual subscribers, such as management of billing data and selective transmission of data, such as multimedia data, to a specific end user device 102. The service network 110 may be implemented in a single computing device or in many computing devices, and typically includes one or more server 112, such as a media server of a content provider, a communication server, etc.

Each end user device 102 may be, as noted above, a variety of devices. For example, each end user device 102 may be a smartphone, a laptop computer, a tablet computer, a smartphone, or any other suitable end point device capable of connecting to a LAN. In general, the end user devices 102 may include a platform that can receive and execute software applications, data and/or commands transmitted over the communication network that may ultimately come from the service network 110, the Internet 108 and/or other remote servers and networks.

The various embodiments are particularly useful with Wi-Fi or other IEEE networks to obtain access to service provider core network. However, the embodiments may also be implemented over any combination of wireless and/or wired networks and access protocols, with no changes to the methods, such as broadband networks (e.g., optical network, wireless satellite, cable modem or DSL modem etc.).

Figure 2:
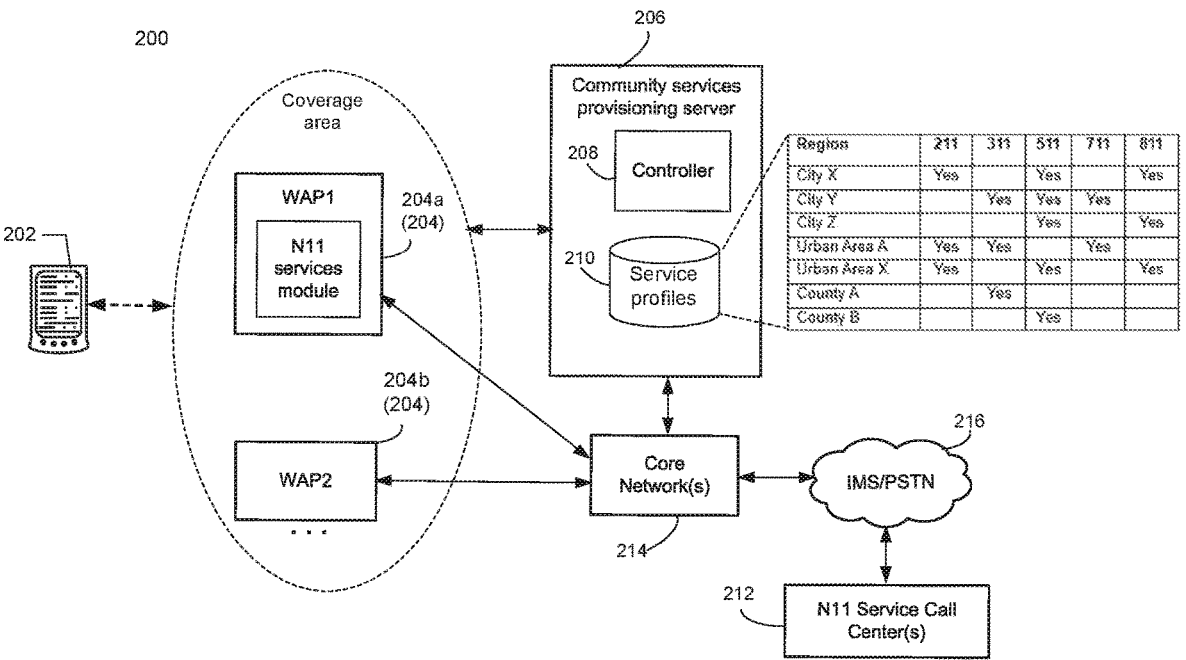
FIG. 2 is a block diagram illustrating an example architecture of a communications system supporting non-emergency service voice calls according to various embodiments.

In various embodiments, a WLAN may be represented by one or more wireless access points (e.g., access point 104), an interface to the WLAN, and the medium carrying data between one or more user wireless communication device and the interface to the WLAN (i.e., the air interface). An architecture of an embodiment system to support non-emergency community services over WLAN implemented by a service provider network is illustrated in FIG. 2. With reference to FIGS. 1 and 2, the system 200 may be similar to communications system 100 and/or components thereof. The system 200, which may be configured to provide communications services to one or more end user device(s) 202, may include at least one wireless access point, shown as wireless access point ("WAP") 204a and WAP 204b, and a wireless community services provisioning server 206 including a controller 208, and service profiles 210.

In various embodiments, a mobile application may be installed on an end user device 202, and may be specifically designed to display the non-emergency community services supported by service providers. The installed application (i.e., "N11 application") may monitor surrounding wireless access points (e.g., WAP 204a, 204b), and detect networks supporting non-emergency community service calls. Through the N11 application, the end user device(s) 202 may collect information about the capabilities and N11 services provided by the wireless access point(s) 204 serving the device's current location prior to associating with a network. The N11 application may use the collected information to display available N11 services on the end user device(s) 202.

The wireless access point(s) 204a, 204b may be operative to wirelessly communicate with end user device(s) 202, such as a wireless device. In some embodiments, the wireless access points 204a, 204b may implement the wireless network protocol specified in the IEEE 802.11 WLAN specification. While the example coverage area for the end user device(s) 202 is illustrated in FIG. 2, as including two wireless access points 204a, 204b, it should be understood that any number of access points may be included. In various embodiments, each wireless access point 204 (i.e., 204a, 204b) in the coverage area that is able to support non-emergency community services over WLAN may include an N11 services module.

While shown only for wireless access point 204a, it should be understood by those of ordinary skill in the art that the N11 services module may be included in all wireless access points 204 (i.e., 204a, 204b) that are configured to support non-emergency community service voice calls according to the various embodiments.

The N11 services module according to various embodiments may be an application that may be configured to implement steps to recognize that information about available N11 services has been requested, to retrieve such information, and to provide a response with the requested information, according to various embodiments. In particular, the N11 services module of the wireless access point(s) 204 may relay requests about available N11 services to the community services provisioning server 206, along with location information (e.g., location of the end user device(s) 202 and/or the wireless access point 204) and information about the capabilities of the end user device(s) 202.

The community services provisioning server 206 may include a database/repository capable of storing service profiles 210 as configuration objects. In various embodiments, the service profiles 210 may link the N11 services offered by one or more service provider with various geographical locations.

In some embodiments the controller 208 of the provisioning server 206 may be configured to manage and distribute N11 service profiles 210 to the wireless access points 204 associated with a service provider/network operator.

In various embodiments, the community services provisioning server 206 may implement location based N11 services availability provisioning and rendering service logic. Specifically, service providers and network operators may use provisioning interfaces to define the N11 services offered in different communities or geographical regions. Such service information may be processed by the controller 208 and stored as one or more service profile 210.

In some embodiments, the controller 208 may be configured to receive a notification from at least one wireless access point 204 in which a end user device(s) 202 within the coverage area has requested information about N11 services available (e.g., by a probe response frame sent from the wireless access point 204 to the wireless device 202). In some embodiments, the controller 208 may coordinate selection of a serving access point (e.g., WAP 204a or WAP 204b). In some embodiments, the controller 208 may provide an N11 services profile to a requesting access point (e.g., WAP 204a or WAP 204b) based on location (e.g., of the end user device(s) 202 and/or the access point 204) and end user device(s) 202 capabilities.

In various embodiments, the selected access point (e.g., WAP 204a or WAP 204b) may provide details about N11 services available to an end user device (e.g., wireless device 202) using the N11 services profile received from the controller 208 of the provisioning server 206. In some embodiments, the selected access point (e.g., WAP 204a or WAP 204b) may send a public action frame response to the end user device. Such functions may be implemented as one or more software module in an application executed on a processor, as one or more hardware module (e.g., hardware component(s) wired to perform such functions), or as combinations of hardware component(s) and software module(s) running on one or more processors.

In some embodiments, the functions of the controller 208 may include further tasks to manage establishing a non-emergency community services call routed to a an N11 service call center 212 via a wireless access point 204 and at least one core network 214. In various embodiments, the controller 208 may be implemented by one or several interlinked computers, i.e., a hardware platform, a software platform basing on the hardware platform and several application programs executed by the system platform formed by the software and hardware platform. The functionalities of the controller 208 may be provided by the execution of these application programs.

In some embodiments, additional network elements may provide access control to the communication network associated with the service provider (e.g., core network(s) 214), such as by providing access control rules that may be stored in memory, and filtering arriving data packets before admitting them to the communication network based on such rules. In various embodiments, access control/location service may be implemented by one or more server such as an authentication, authorization, and accounting (AAA) server.

Access control/location service may also include functions to locate and store information regarding the location of end user device 202 that seeks to associate with the communication network (i.e., create a communication link between the end user device 202 and the communication network). In various embodiments, the location of a user end user device 202 may be identified and/or updated by extracting information from messages received from that end user device 202 during association with a wireless access point 204 (e.g., 204*a*). Such information may be provided from the serving wireless access point 204 using any of a number of supported networking protocols, such as Remote Authentication Dial-In User Service (RADIUS)) messaging. The access control/location service may also use any of a number of supported networking protocols for communication with other entities in the system (e.g., with elements of the core network(s) 214).

The system 200 may also include components of various core networks. The core network(s) 214 may include an IP core network (e.g., Wi-Fi), as well as one or more mobile core network (e.g., an LTE network, 2G/3G network, etc.). The IP core network may provide a gateway between a WLAN and the one or more mobile core network. Components of an IP core network may include, for example, a Tunnel Termination Gateway (TTG)/Packet Data Gateway (PDG). The IP core network may also include network services such as a DHCP server that allocates a unique Internet Protocol (IP) address to each wireless device 202 upon association with a wireless access point 204 in order to access the network. In some embodiments, the DHCP server may be connected to a DHCP database. Additionally or alternatively, the DHCP server may be used to assign address or access information using other protocols.

In some embodiments, an LTE mobile core network may be an evolved packet core (EPC) that includes, for example, at least one Mobility Management Entity (MME), a Serving Gateway (SGW), and a Packet Data Network (PDN) Gateway (PGW).

In some embodiments, the system 200 may include one or more radio access network that uses cellular network protocols, for example, an LTE radio access network (e.g., Evolved UMTS Terrestrial Radio Access Network (E-UTRAN)). The E-UTRAN may connect to the EPC through the SGW, which may be logically connected to the PGW. The MME may handle tracking and paging of a wireless device 202 and security for E-UTRAN access on the EPC. The MME may be linked to a Home Subscriber Server (HSS), which may support a database containing user subscription, profile, and authentication information. Further, the MME may provide bearer and connection management for user Internet protocol (IP) packets, which are transferred through the SGW. The SGW may route, via external IP networks (e.g., PDN(s)), incoming and outgoing IP packets for wireless devices connected to the SGW. The E-UTRAN. The SGW may also provide an anchor point for handovers between access points of the E-UTRAN (e.g., eNodeBs). The SGW may be logically connected to a PDN Gateway (PGW), which may route packets to and from PDNs to form a connection between the EPC and various PDNs. The PGW may be logically connected to a Policy Charging and Rules Function (PCRF), a software component that may enforce minimum quality of service parameters, and manage and control data sessions. The PGW may also provide connections with other public or private networks (e.g., the Internet, an Intranet, an IP Multimedia Subsystem (IMS), etc.). The mobile core network(s) may further include a circuit switched network and/or packet switched network. For example, a PS core may be a UMTS core network that includes a Serving GPRS support node (SGSN) and a Gateway GPRS support node (GGSN). The SGSN may provide an interface with (or gateway to) an access network (e.g., a radio access network or a WLAN), and the GGSN which may be connected to external PS networks (i.e., the Internet, various PDNs, etc.).

The system 200 may also include IMS/Public Switched Telephone Network (PSTN) 216, which may be in communication with the core network(s) 214. For example, a PGW may provide the connection to the IMS in an LTE network (e.g., EPC). In this manner, the IMS may provide communication between the mobile core network (e.g., EPC) with the PSTN. Further, the IMS may provide an interface with additional external packet data networks. In this manner, voice calls may take place over both traditional telephony services and IP-based services.

The system 200 may also include one or more N11 service call center 212, to which data packets related to non-emergency community service voice calls may be routed via the core network(s) 214 and IMS/PSTN 216. The dialing of a short code for non-emergency community service through the N11 application may connect the end user device 202 to an appropriate N11 service call center 212 based on location.

In some embodiments, additional location information associated with the serving wireless access point 204 may be used to connect an end user device 202 to the N11 service call center 212. In some embodiments, such location information may be provided through SIP messaging with the core network(s) 214, such as in a portion of a SIP INVITE message. The wireless access point 204 location may be stored in a wireless network registry of an end user device 202 upon establishing a call. Thus, in embodiments in which an outbound call from an end user device 202 is a SIP-based communication, a SIP location field may be utilized to forward the location of the wireless access point 204 in the SIP INVITE message. The identification and/or location of the wireless access point 204 may be used by the core network to assist with routing the non-emergency community service call to the appropriate N11 service call center 212.

The term "system-on-chip" or "SoC" is used herein to refer to a set of interconnected electronic circuits typically, but not exclusively, including multiple hardware cores, a memory, and a communication interface. The hardware cores may be of a variety of different types of processors, such as a multi-core central processing unit (CPU), a multi-core digital signal processor (DSP), a multi-core accelerated processing unit (APU), and a multi-core auxiliary processor.

Figure 3:
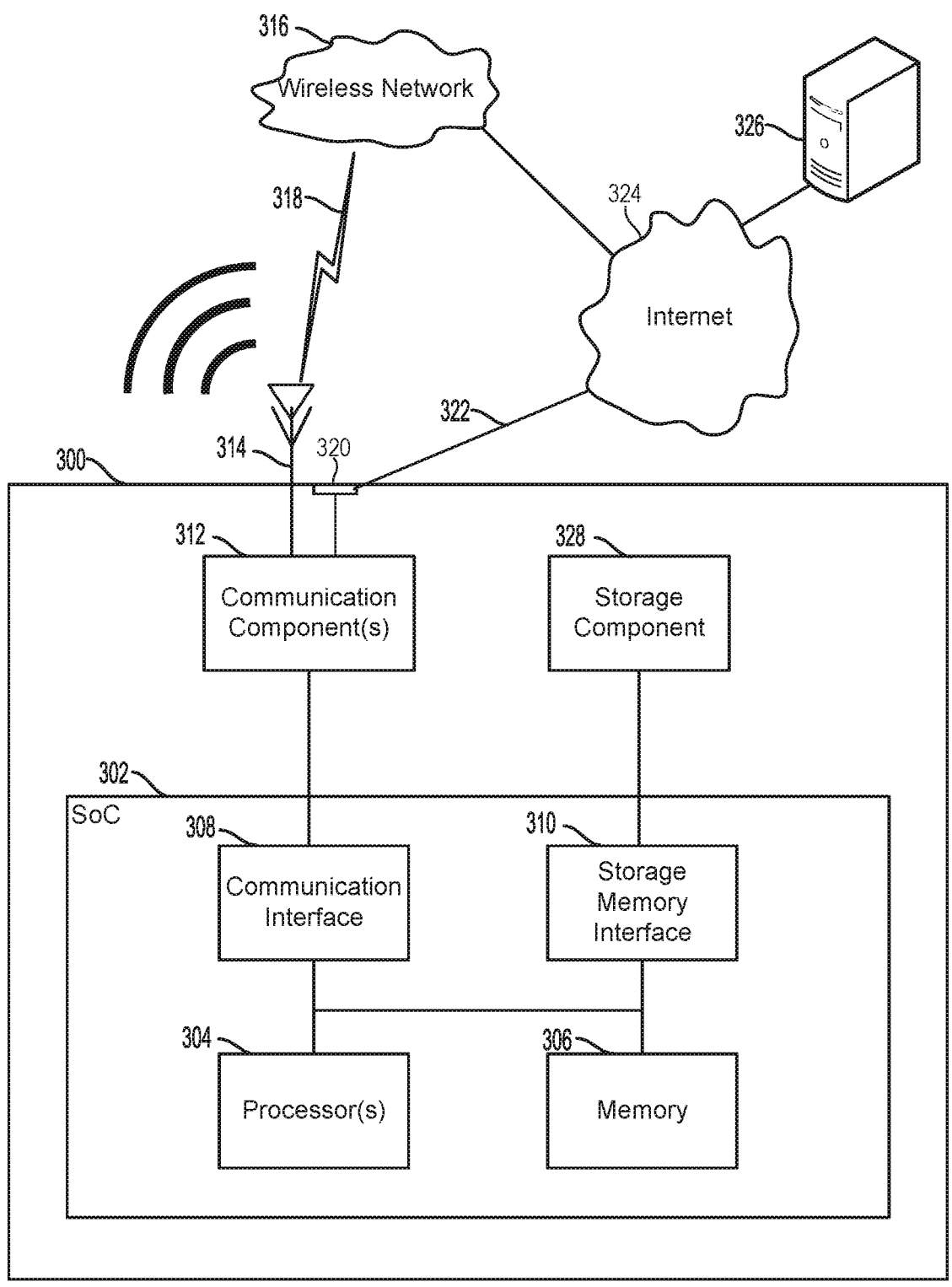
FIG. 3 is a component block diagram illustrating a network computing device suitable for implementing an embodiment.

FIG. 3 illustrates an example of an access point 300 configured to obtain and to signal to end user devices information about non-emergency community services supported by the network/WLAN. With reference to FIGS. 1-3, the access point 300 may be an example of one or more wireless access point 204.

The access point 300 may include a SoC 302 with a processor 304, a memory 306, a communication interface 308, and a storage memory interface 310. The access point 300 may further include one or more communication component 312, such as a network interface (e.g., an 802.3 interface) for communication with a LAN, a wireless network interface 320 (e.g., an IEEE 802.11 WLAN interface) for wireless communication with one or more wireless communication devices over Wi-Fi, a radio frequency (RF) transceiver (or other receiver and transmitter circuitry) configured to perform transmit/receive functions in particular RF spectrum frequency range(s), etc.

The communication component(s) 312 and corresponding antenna(s) 314 may be configured to send data to, and receive data from, devices within a WLAN using a supported wireless communication protocol. Further, a communication component(s) 312 and corresponding antenna 314 may be configured to access an external wireless network 316 for additional features and/or network services. A connection 318 to the wireless network 316 may use any of a number of wireless standards, for example, Wi-Fi, WiMAX, or mobile VoIP, and/or may be based on mobile broadband or cellular network technology. Examples of wireless networks based on cellular network technology may include Code Division Multiple Access (CDMA) networks, Time Division Multiple Access (TDMA) networks, and Frequency Division Multiple Access (FDMA) networks. The wireless network 316 may utilize various radio technologies such as Wideband-CDMA (W-CDMA), cdma2000, Global System for Mobile Communications (GSM), etc.

The communications component(s) 312 may also be coupled to a network interface 320 that supports a wired connection 322 to the Internet 324. The home gateway 300 may communicate with, for example, one or more remote computing device 326 over the wireless connection 318 and/or the wired connection 322. In some embodiments, the remote computing device may be a server associated with a service provider.

The wireless access point 300 may also include software modules (including Dynamic Host Configuration Protocol (DHCP) clients, and device drivers (e.g., network and WLAN interface drivers) stored in the memory 306 (e.g., a hard disk drive, flash memory, EEPROM, etc.). At start up, these software components may be loaded into system memory and then accessed and executed by processor 304.

The access point 300 may include one or more controller, on which any of a variety of processing devices of the SoC 302 (e.g., processor(s) 304) may be implemented, and may include a number of processing cores. The access point 300 may also include processors that are not associated with a SoC 302. In various embodiments, the processor(s) 324 may execute any number of applications, including an emergency service module.

The memory 306 of the SoC 302 may be configured for storing data and processor-executable code for access by the processor 304. The memory 306 may include, for example, volatile memory configured to temporarily hold a limited amount of data received from a data sensor or subsystem.

The access point 300 may also include a storage component 328, which may be a non-volatile memory device (e.g., a read-only memory, flash memory, hard disk drive, solid state drive, etc.). The storage memory interface 310 and storage component 328 may work in unison to allow the access point to store data (e.g., SSID template(s)) and processor-executable code on a storage medium. The storage memory interface 310 may control access to the storage component 328, and may allow the processor 304 to read data from and write data to the storage component 328.

The communication interface 308, communication component(s) 312, antenna(s) 314, and/or network interface 320 may work in unison to enable the home gateway 300 to communicate over the wireless network 316 via a wireless connection 318, and/or a wired connection 322 with the remote computing device 326. As described, the wireless network 316 may be implemented using a variety of wireless communication technologies, including, for example, radio frequency spectrum used for wireless communications, to provide the home gateway 300 with a connection to the Internet 324 by which it may exchange data with the remote computing device 326.

It should be noted that some or all of the components of the access point 300 may be differently arranged and/or combined while still serving the necessary functions. Moreover, the access point 300 may not be limited to one of each of the components, and multiple instances of each component, in various configurations, may be included in the access point 300.

In various embodiments, an operator (or service provider) may support non-emergency community service calls over WLAN by preconfiguring the provisioning server with information about N11 services offered in different geographic locations. Using this information, at least one N11 service profile may be developed and stored as a configuration object on the provisioning server, and sent to a wireless access point when needed. That is, the wireless access point may retrieve an N11 service profile that is stored by the provisioning server.

In various embodiments, a non-emergency service call request may be triggered on a user wireless device by the native call dialer (e.g., dialing an N-1-1 short code), and/or through an interface of the N11 application running on the wireless device. In various embodiments, the coordination and selection of a serving access point (i.e., 104, 204, 300) may be performed by the N11 application on a wireless device based on the user selecting a desired N11 service from those available. Such available services may be displayed to the user through an N11 application interface on the device.

Figure 4B:
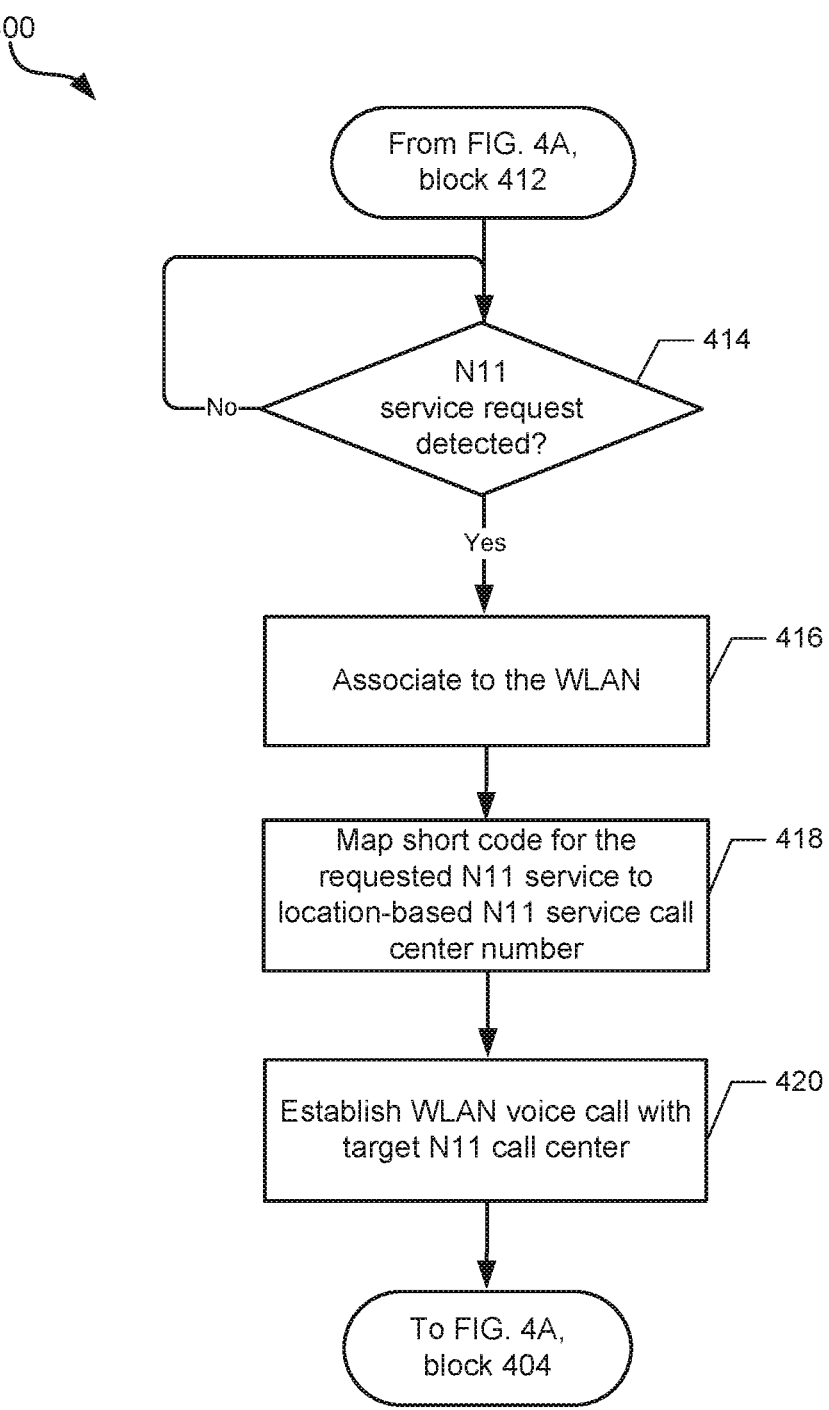

FIGS. 4A and 4B illustrate a method 400 of implementing non-emergency voice-over-WLAN call support on an end user device 202 according to some embodiments. With reference to FIGS. 1-4B, the operations of the method 400 may be implemented by one or more control module, such as on processor(s) of an end user device 202. Some operations of the method 400 may additionally or alternatively be implemented on one or more processor (e.g., 304) of a wireless access point (e.g., 204, 300), or one or more control entity of a wireless network manager.

While described with reference to one entity (e.g., a wireless access point) and end user device 202, such references are merely used as an example, as the method 400 may be applied by and to any of a number of different end user device(s) 202 and/or access point(s) 204 within the service network 100.

In block 402, the processor of an end user device 202 may detect that an N11 application installed on the end user device 202 has been activated to monitor surrounding wireless networks. In some embodiments, activation of the N11 application monitoring may be the result of a user selection, such as selecting to open/start the application, or selection of a specific instruction/command when the application is already running. In some embodiments, the N11 application may already be running as a background process on the end user device 202, and network monitoring may be automatically activated as a result of various conditions (travel on an interstate, through a previously-tagged region, etc.).

In block 404, the processor of an end user device 202 may receive beacon frames from one or more wireless access point(s) (e.g., WAP 204a and/or WAP 204b). As described herein, the beacon frames transmitted by wireless access points to advertise WLAN presence may include an indicator of network support for non-emergency community services (i.e., N11 services).

In determination block 406, the processor of an end user device 202 may determine whether N11 services are supported by an identified WLAN. Such determination may be made based on the information in the received beacon frames. In response to determining that the identified WLAN does not support N11 services (i.e., determination block 406="No"), the processor of an end user device 202 may return to block 404 for receipt of beacon frames from a different wireless access point.

In response to determining that the identified WLAN supports N11 services (i.e., determination block 406="Yes"), the processor of an end user device 202 may request information about the WLAN capabilities including the available N11 services in block 408. Such request may be sent, for example, as a probe request frame to the wireless access point 204 associated with the identified WLAN (i.e., based on the beacon frames received in block 404). In various embodiments, the wireless access point 204 may relay such request to a community services provisioning server (e.g., 206) along with information about the end user device 202 (e.g., location, device capabilities, etc.).

In block 410, the processor of an end user device 202 may receive N11 service details from the wireless access point 204 associated with the identified WLAN. Such details may be provided, for example, in a public action frame response message sent to the processor of an end user device 202 by the wireless access point 204. In various embodiments, the N11 service details sent to the processor of an end user device 202 may be based on an N11 profile that the wireless access point 204 retrieved from the provisioning server.

In block 412, the processor of an end user device 202 may store and display the available N11 services through the N11 application running on the end user device 202. Specifically, based on the details received from the wireless access point 204, the N11 application may be populated with a list of location-based N11 services that are currently available to the end user device 202.

In determination block 414, the processor of an end user device 202 may determine whether an N11 service request is detected. For example, an N11 service request may be based on user input (e.g., through a touchscreen, keyboard, etc.) as a selection through the N11 application interface.

In response to determining that an N11 service request is not detected (i.e., determination block 414="No"), the processor of an end user device 202 may continue to monitor for a N11 service request in determination block 414. In response to determining that an N11 service request is detected (i.e., determination block 414="Yes"), the processor of an end user device 202 may associate to the WLAN for the requested N11 service, block 416. In some embodiments in which more than one WLAN may support the requested N11 service in the current location, the processor of an end user device 202 may select the WLAN with which to associate based on additional criteria (e.g., signal strength, proximity of the corresponding wireless access point, preferred network settings, etc.). In various embodiments, association of the end user device 202 to the WLAN network may performed using established IEEE 802.11 standards and protocols.

In block 418, the processor of an end user device 202 may, through the N11 application, map the short code for the requested N11 service to a location-based N11 service call center number. For example, if a user has navigated the N11 application on the wireless device to select the "811" service (e.g., through dialing "8-1-1" or using another input mechanism), the N11 application may internally cause the processor of an end user device 202 to dial the location-specific 811 call center. In some embodiments, the contact numbers for the various location-specific call centers may be provided in the N11 service details received from the corresponding wireless access point (i.e., in block 410).

In block 420, the processor of an end user device 202 may establish a WLAN voice call with the target N11 service call center. In various embodiments, establishing such call may be through the service provider's/operator's core network, and may utilize a gateway. The established WLAN voice call may use any of a variety of communication protocols (e.g., VoIP, Wi-Fi, etc.), depending on the capabilities of the target N11 service call center.

Following completion of the N11 service call, the processor of an end user device 202 may return to block 404 to continue receiving beacon frames from nearby wireless access points 204.

Figure 5:
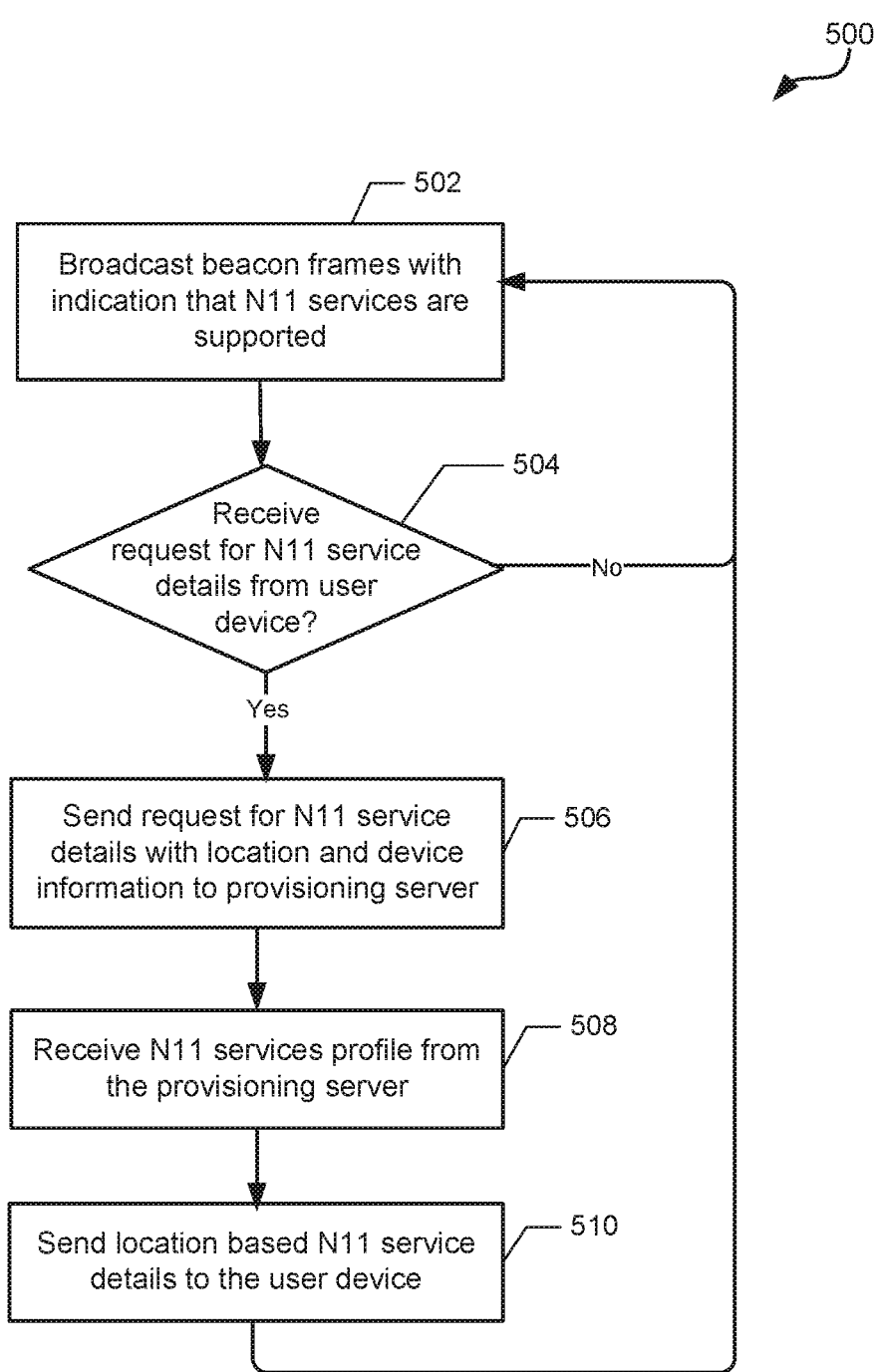
FIG. 5 is a process flow diagram illustrating an example method for supporting non-emergency community services through voice-over-WLAN calls according to various embodiments.

FIG. 5 illustrates a method 500 of implementing non-emergency voice-over-WLAN call support in a wireless communication network according to some embodiments. With reference to FIGS. 1-5, the operations of the method 500 may be implemented by one or more control entity managed by or associated with a service network (e.g., service network 110), such as on processor(s) (e.g., 304) of a wireless access point (e.g., 204, 300). Some operations of the method 500 may additionally or alternatively be implemented by one or more control entity of a wireless network manager.

While described with reference to one entity (e.g., a wireless access point) and one end user device 202, such references are merely used as an example, as the method 400 may be applied by and to any of a number of different access point(s) 204 and end user device(s) 202 within the service network.

In block 502, the service network processor (e.g., processor 304 of a WAP 204) may cause the wireless access point 204 to broadcast beacon frames that have, among other information (e.g., SSID, etc.), an indication that N11 services are supported by the associated WLAN.

In determination block 504, the service network processor may determine whether a request for N11 service details for the corresponding WLAN has been received from an end user device 202. In response to determining that a request for N11 service details for the corresponding WLAN has not been received (i.e., determination block 504="No"), the service network processor may return to broadcast beacon frames in block 502.

In response to determining that a request for N11 service details for the corresponding WLAN has been received (i.e., determination block 504="Yes"), in block 506 the service network processor may send the request for N11 service details to the provisioning server (i.e., 206) along with location information and end user device's 202 capabilities.

In block 508, the service network processor may receive one or more N11 services profile from the provisioning server 206. Specifically, the N11 services profile(s) may have been configured by the service provider/network operator and stored on the provisioning server 206.

In block 510, the service network processor may send location-based N11 service details to the end user device 202. Specifically, such location-based N11 service details may be based on the profile(s) that were received from the provisioning server 206. The service network processor may return to block 502 to continue broadcasting beacon frames.

The references to various end user device(s) 202 and/or wireless access points 204 are arbitrary and used merely for the purposes of describing the embodiments. That is, any indicator, name, or other designation to differentiate messaging associated with different access points and devices may be assigned, without changing the embodiment methods.

Figure 6:
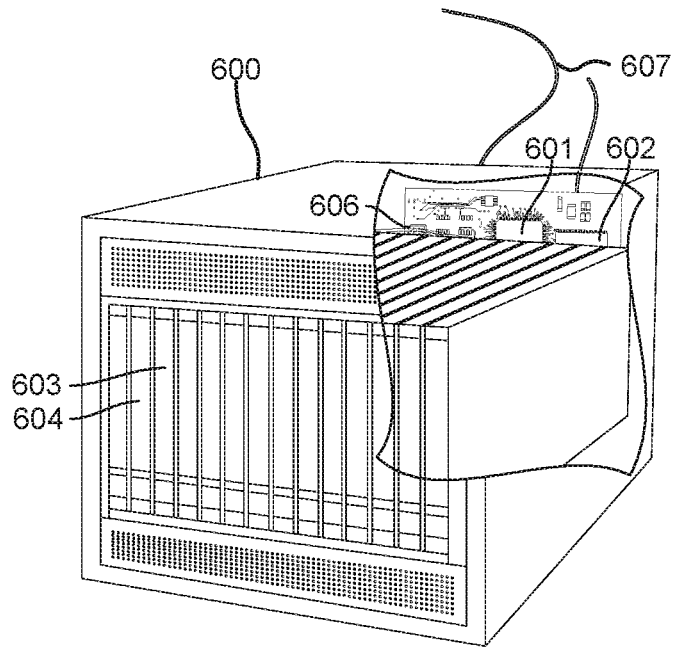
FIG. 6 is a component block diagram of an example server suitable for use with various embodiments.

The various embodiments may be implemented on any of a variety of commercially available server devices, such as the server 600 illustrated in FIG. 6. For example, with reference to FIGS. 1-6, a server 600 (which may correspond, for example, to the server 600 and/or the remote computing device 326 in FIGS. 1 and 3, respectively) may include a processor 601 coupled to volatile memory 602 and a large capacity nonvolatile memory, such as a disk drive 603. The server 600 may also include a floppy disc drive, compact disc (CD) or DVD disc drive 604 coupled to the processor 601. The server 600 may also include network access ports 606 coupled to the processor 601 for establishing network interface connections with a network 607, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Figure 7:
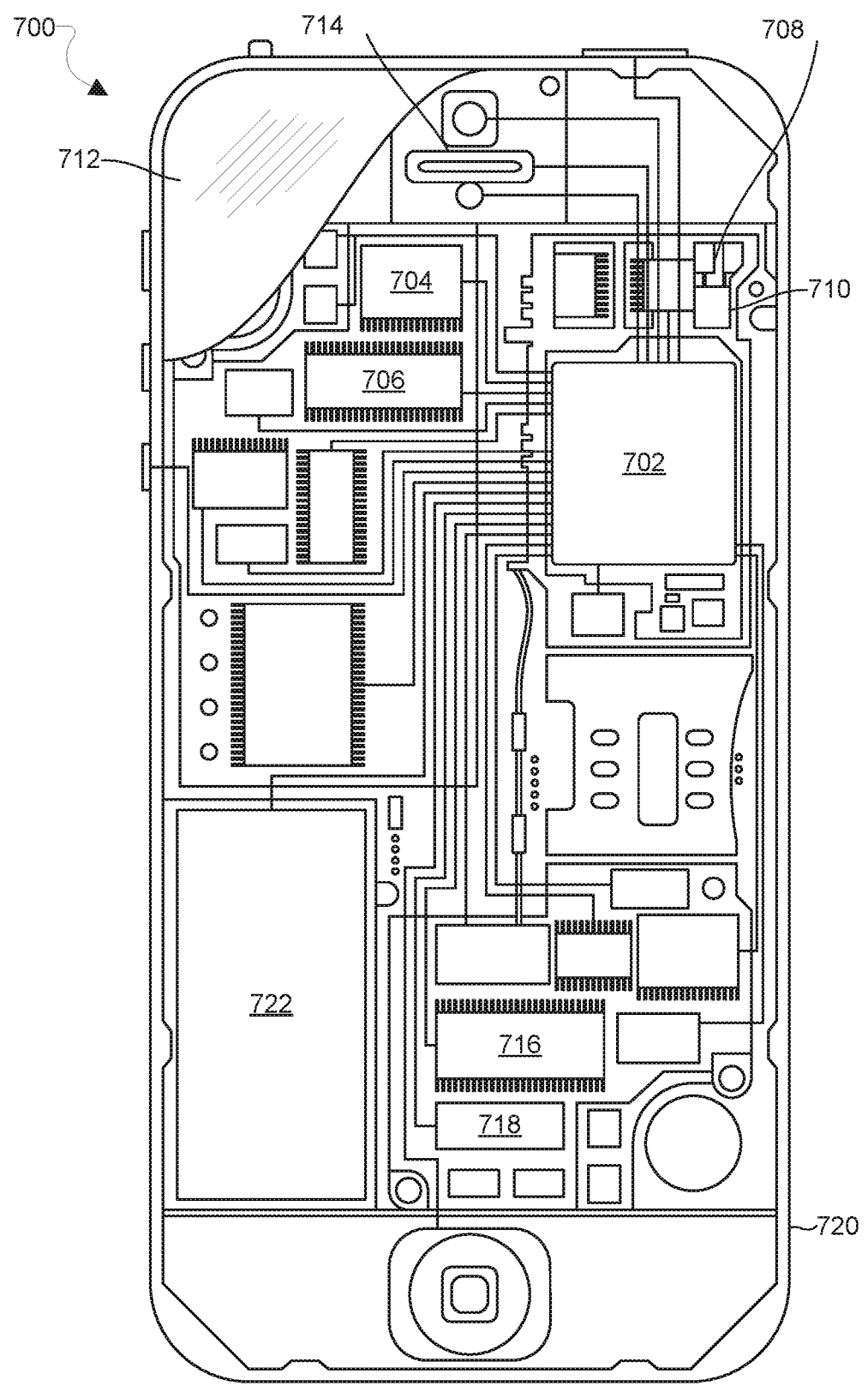
FIG. 7 is a component diagram of an example wireless communication device suitable for use with the various embodiments.

Various embodiments may also be implemented in any of a variety of end user device(s) 202, an example of which is illustrated in FIG. 7. For example, with reference to FIGS. 1-7, a wireless device 700 (which may correspond, for example, the end user wireless devices 102, 202) may include a processor 702 coupled to a touchscreen controller 704 and an internal memory 706. The processor 702 may be one or more multicore integrated circuits (ICs) designated for general or specific processing tasks. The internal memory 706 may be volatile or non-volatile memory, and may also be secure and/or encrypted memory, or unsecure and/or unencrypted memory, or any combination thereof. The wireless device 700 may include a battery/power source 722.

The touchscreen controller 704 and the processor 702 may also be coupled to a touchscreen panel 712, such as a resistive-sensing touchscreen, capacitive-sensing touchscreen, infrared sensing touchscreen, etc. and speaker/microphone 714. The wireless device 700 may have one or more radio signal transceivers 708 (e.g., Peanut®, Bluetooth®, Zigbee®, Wi-Fi, RF radio) and antennae 710, for sending and receiving, coupled to each other and/or to the processor 702. The transceivers 708 and antennae 710 may be used with the above-mentioned circuitry to implement the various wireless transmission protocol stacks and interfaces. The wireless device 700 may include a cellular network wireless modem chip 716 that enables communication via a cellular network and is coupled to the processor.

The wireless device 700 may include a peripheral device connection interface 718 coupled to the processor 702. The peripheral device connection interface 718 may be singularly configured to accept one type of connection, or multiply configured to accept various types of physical and communication connections, common or proprietary, such as USB, FireWire, Thunderbolt, or PCIe. The peripheral device connection interface 718 may also be coupled to a similarly configured peripheral device connection port (not shown). The wireless device 700 may also include speakers 714 for providing audio outputs.

The wireless device 700 may also include a housing 720, constructed of a plastic, metal, or a combination of materials, for containing all or some of the components discussed herein. The wireless device 700 may include a power source 722 coupled to the processor 702, such as a disposable or rechargeable battery. The rechargeable battery may also be coupled to the peripheral device connection port to receive a charging current from a source external to the wireless device 700.

The processors 601, 702, and modem or modem chip 716 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in an internal memory before they are accessed and loaded into the processors 601, 702, and modem or modem chip 716.

The processors 601, 702, and modem or modem chip 716 may include internal memory sufficient to store the application software instructions. In many devices the internal memory may be a volatile or nonvolatile memory, such as flash memory, or a mixture of both. For the purposes of this description, a general reference to memory refers to memory accessible by the processors 601, 702, and modem or modem chip 716, including internal memory or removable memory plugged into the wireless communication device and memory within the processors 601, 702, and modem or modem chip 716 themselves.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers.

Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of supporting non-emergency community services in a wireless communication network, the method comprising:

detecting, by an end user device, activation of an over-the-top (OTT) application, wherein the OTT application is configured to monitor surrounding wireless networks;

receiving, by the end user device, broadcasts from an access point that is located nearby and wherein the broadcasts identify a wireless network;

determining, by the end user device, whether the wireless network identified by the broadcasts supports non-emergency community services based on the received broadcasts; and in response to determining that the wireless network identified by the broadcasts supports non-emergency community services:

sending, by the end user device, a request for details about supported non-emergency community services to the access point;

receiving, by the end user device, a response message from the access point identifying location-specific non-emergency community services offered by the wireless network; and displaying, by the end user device, the offered location-based non-emergency community services.

2. The method of claim 1, wherein displaying the offered non-emergency community services is done at least in part through the OTT application.

3. The method of claim 1, wherein the broadcasts from the nearby access point are beacon frames that include at least a service set identifier (SSID) for the wireless network.

4. The method of claim 1, further comprising in response to determining that the identified wireless network supports non-emergency community services:

determining, by the end user device, whether user input requesting one of the offered location-based non-emergency services is detected.

5. The method of claim 4, wherein the user input requesting one of the offered location-based non-emergency services is a numeric short code.

6. The method of claim 4, further comprising, in response to determining that user input requesting one of the offered location-based non-emergency services is detected:

linking, by the end user device, the detected service request with contact information for a target location-based call center; and establishing, by the end user device, a voice call with the target location based call center.

7. The method of claim 6, wherein linking the detected service request with contact information for the target location-based call center is performed at least in part by the OTT application.

8. The method of claim 6, wherein the voice call with the target location-based call center is a communication using voice-over-IP (VOIP) or voice-over-wireless local area network (WLAN).

9. The method of claim 1, wherein the non-emergency services are selected from one or more of community information/referral services, non-emergency police services, directory assistance services, transportation information services, telecommunications relay services, and underground public utility location services.

10. The method of claim 1, wherein the request for details about supported non-emergency community services sent to the access point is a probe request frame.

11. The method of claim 1, wherein the location-specific community non-emergency community services offered by the wireless network are set by a network operator and stored on a provisioning server in communication with the access point.

12. A method of supporting non-emergency community services in a wireless communication network, the method comprising:

broadcasting, by an access point, information identifying a wireless network associated with the access point and an indication that non-emergency community services are supported;

receiving, by the access point, a request from a user device for details about the supported non-emergency community services;

sending, by the access point, a message with location and capabilities of the user device to a provisioning server;

receiving, by the access point, a non-emergency community services profile from the provisioning server, wherein the profile identifies location-based non-emergency community services available through the wireless network to the user device; and sending, by the access point, a message to the user device identifying the available location-based non-emergency community services.

13. The method of claim 12, wherein the non-emergency community services profile is provisioned by a network operator through an interface on the provisioning server.

14. A computing device, comprising:

a processor configured with executable instructions configured to cause the processor to perform operations comprising:

detecting activation of an over-the-top (OTT) application, wherein the OTT application is configured to monitor surrounding wireless networks;

receiving broadcasts from an access point that is located nearby and wherein the broadcasts identify a wireless network;

determining whether the wireless network identified by the broadcasts supports non-emergency community services based on the received broadcasts; and in response to determining that the wireless network identified by the broadcasts supports non-emergency community services:

sending a request for details about supported non-emergency community services to the access point;

receiving a response message from the access point identifying location-specific non-emergency community services offered by the wireless network; and displaying the offered location-based non-emergency community services.

15. The computing device of claim 14, wherein the processor is configured with executable instructions configured to cause the processor to perform operations such that displaying the offered non-emergency community services is done at least in part through the OTT application.

16. The computing device of claim 14, wherein the broadcasts from the nearby access point are beacon frames that include at least a service set identifier (SSID) for the wireless network.

17. The computing device of claim 14, wherein the processor is configured with executable instructions configured to cause the processor to perform operations further comprising, in response to determining that the identified wireless network supports non-emergency community services:

determining, by the end user device, whether user input requesting one of the offered location-based non-emergency services is detected.

18. The computing device of claim 17, wherein the user input requesting one of the offered location-based non-emergency services is a numeric short code.

19. The computing device of claim 17, wherein the processor is configured with executable instructions configured to cause the processor to perform operations further comprising, in response to determining that user input requesting one of the offered location-based non-emergency services is detected:

linking the detected service request with contact information for a target location-based call center; and establishing a voice call with the target location-based call center.

20. The computing device of claim 19, wherein the processor is configured with executable instructions configured to cause the processor to perform operations such that linking the detected service request with contact information for the target location-based call center is performed at least in part by the OTT application.

21. The computing device of claim 19, wherein the voice call with the target location-based call center is a communication using voice-over-IP (VOIP) or voice over-wireless local area network (WLAN).

22. The computing device of claim 14, wherein the non-emergency services are selected from one or more of community information/referral services, non emergency police services, directory assistance services, transportation information services, telecommunications relay services, and underground public utility location services.

23. The computing device of claim 14, wherein the request for details about supported non-emergency community services sent to the access point is a probe request frame.

24. The computing device of claim 14, wherein the location-specific community non-emergency community services offered by the wireless network are set by a network operator and stored on a provisioning server in communication with the access point.

* * * * *